(12) United States Patent
Topaltzas

(10) Patent No.: US 8,203,905 B2
(45) Date of Patent: Jun. 19, 2012

(54) ACOUSTIC MOUNT SYSTEM, METHOD AND DEVICE FOR TESTING MOBILE TELEPHONES

(75) Inventor: Dimitrios M. Topaltzas, Ellicott City, MD (US)

(73) Assignee: Metrico Wiresless, Inc., Frederick, MD (US)

( * ) Notice: Subject to any disclaimer, the term of this patent is extended or adjusted under 35 U.S.C. 154(b) by 290 days.

(21) Appl. No.: 12/693,233

(22) Filed: Jan. 25, 2010

(65) Prior Publication Data

US 2011/0183664 A1  Jul. 28, 2011

(51) Int. Cl.
*H04W 24/00* (2009.01)
(52) U.S. Cl. .......................................... 367/13
(58) Field of Classification Search .................... 367/13; 73/1.82, 1.86; 324/555, 537; 455/425
See application file for complete search history.

(56) References Cited

U.S. PATENT DOCUMENTS

| | | | | |
|---|---|---|---|---|
| 5,839,713 A | * | 11/1998 | Wright | 248/346.01 |
| 2009/0045819 A1 | * | 2/2009 | Lin et al. | 324/555 |
| 2009/0152428 A1 | * | 6/2009 | Cilia | 248/346.03 |
| 2010/0090704 A1 | * | 4/2010 | Chen et al. | 324/537 |
| 2011/0183664 A1 | * | 7/2011 | Topaltzas | 455/425 |

* cited by examiner

*Primary Examiner* — Daniel Pihulic
(74) *Attorney, Agent, or Firm* — Mel Barnes; Capital Legal Group PLLC

(57) ABSTRACT

An acoustic mount system, device and method for testing mobile telephones is provided. In one embodiment, the system includes an ear simulator assembly having a plurality of registration mechanisms and an ear simulator, and wherein the plurality of registration mechanisms and the ear simulator have a first spatial relationship. The system includes an alignment device having a plurality of alignment mechanisms and a speaker opening. The plurality of alignment mechanisms and the speaker opening have a second spatial relationship and wherein the alignment device is configured to be attached to the telephone such as via an adhesive. Each of the plurality of alignment mechanisms of the alignment device is configured to engage one of the registration mechanisms of the ear simulator assembly.

21 Claims, 6 Drawing Sheets

ACOUSTIC MOUNT SYSTEM, METHOD AND DEVICE FOR TESTING MOBILE TELEPHONES

FIELD OF THE INVENTION

The present invention generally relates to systems, methods and devices for evaluating communication devices, and more particularly to a system, method and device for evaluating the parameters of mobile telephones.

BACKGROUND OF THE INVENTION

Mobile telephone devices have become ubiquitous in our society. Wireless carriers, handset manufacturers, end users, and providers of various add-on services want the call performance of mobile telephone devices to be of the highest quality. Thus, there is a need to provide testing with some degree of automation to efficiently perform the testing and limit human errors.

In order to provide automated testing, the mobile telephones under test must be consistently accurately placed in the acoustic mount of the test system. More specifically, the alignment of the mobile telephone speaker with the microphone of the acoustic mount must be consistent across a wide range of telephone designs and multiple positions to allow for objective and reliable testing. However, due to the multitude of mobile telephone designs, it is impractical to build a custom acoustic mount for each mobile telephone design.

Prior art acoustic mounts have included a plethora of adjustment mechanisms to accommodate a plurality of telephone designs. However, consistently installing the telephones into such an acoustic mount is difficult because the speaker of each telephone must be very closely positioned (in alignment) with the ear simulator of the acoustic mount. In addition, the installer often cannot easily see the two components that must be aligned. Furthermore, adjusting the acoustic mount for each telephone installation can be time consuming.

Accordingly, there is a need for an acoustic mount that allows for fast, easy, and reliably accurate installation of mobile telephones of a multitude of designs in order to perform testing in a cost-effective and automated manner. These and other needs may be addressed by one or more embodiments of the present inventions.

SUMMARY OF THE INVENTION

The present invention provides an acoustic mount system, device and method for testing mobile telephones. In one embodiment, the system includes an ear simulator assembly having a plurality of registration mechanisms and an ear simulator, and wherein the plurality of registration mechanisms and the ear simulator have a first spatial relationship. The system includes an alignment device having a plurality of alignment mechanisms and a speaker opening. The plurality of alignment mechanisms and the speaker opening have a second spatial relationship and wherein the alignment device is configured to be attached to the telephone such as via an adhesive. Each of the plurality of alignment mechanisms of the alignment device is configured to engage one of the registration mechanisms of the ear simulator assembly. The first spatial relationship is identical to the second spatial relationship to ensure that the speaker opening aligns with the ear simulator when the alignment mechanisms are engaged with the registration mechanisms.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, devices, communication systems, computers, terminals, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, devices, communication systems, computers, terminals, components, techniques, data and network protocols, software products and systems, operating systems, development interfaces, and hardware are omitted so as not to obscure the description of the present invention.

The present invention provides an acoustic mount system, method and device for testing mobile telephones that allow for fast, easy, and reliably accurate installation of mobile telephones of a variety of mobile telephone designs.

Figure 1:
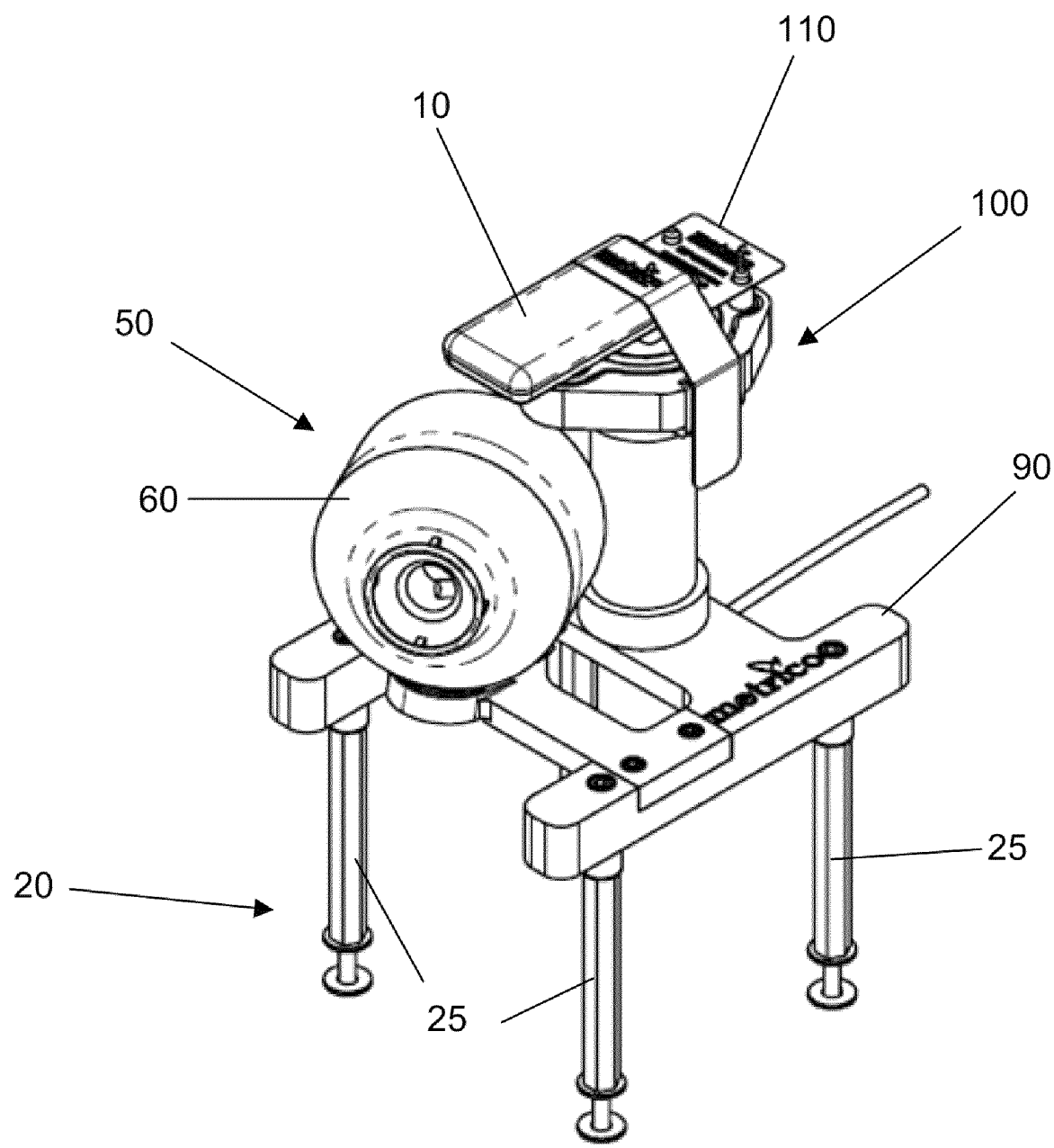
FIG. 1 depicts an acoustic mount according to an example embodiment of the present invention.

FIG. 1 depicts an example embodiment of the present invention in which a mobile telephone has been installed. This example embodiment of the acoustic mount includes a riser leg assembly 20, a mouth simulator assembly 50, a base 90, and an ear simulator assembly 100. The four riser legs 25 of the riser leg assembly 20 are removably attached to the base 90. The mouth simulator assembly 50 includes a mouth simulator 60 attached to a bracket that is attached to the base 90. The ear simulator assembly 100 is also attached to the base 90. A mobile telephone 10 is secured to the top of the ear simulator assembly 100 through use of an alignment device 110.

Figure 2:
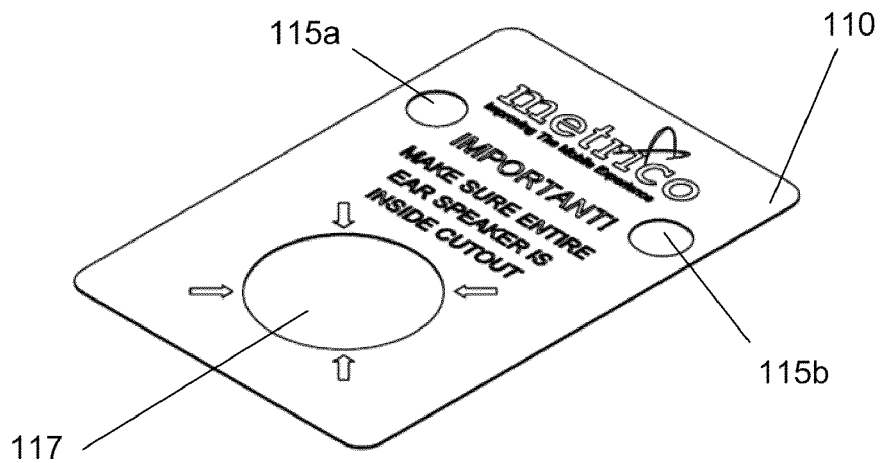
FIG. 2 depicts an alignment device in accordance with an example embodiment of the present invention.
Figure 3:
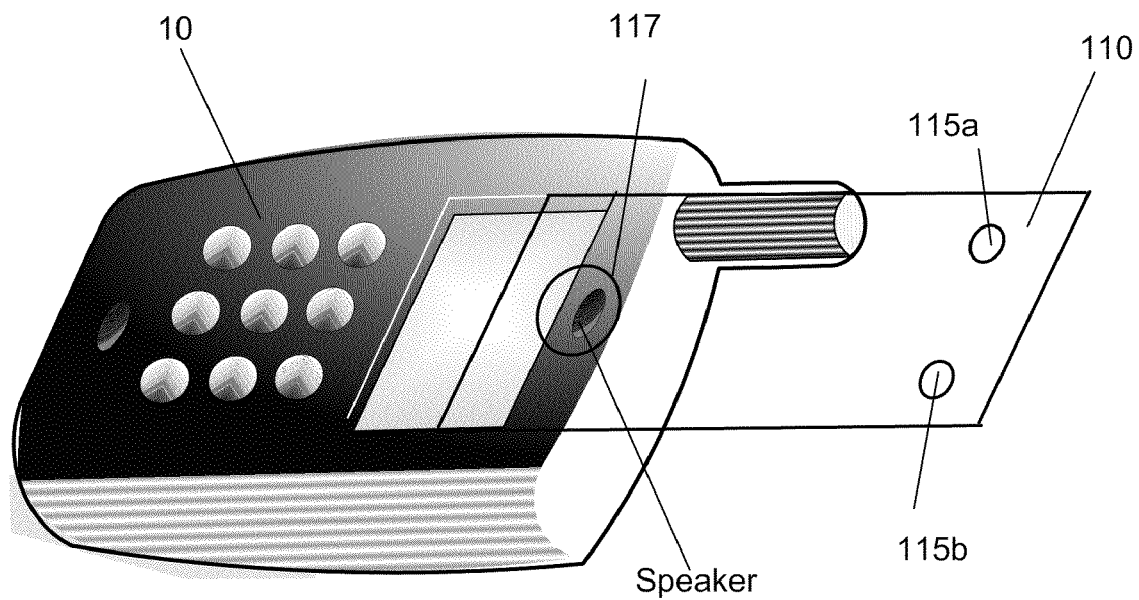
FIG. 3 depicts a telephone and alignment device in accordance with an example embodiment of the present invention.

FIG. 2 depicts the alignment device 110 of an example embodiment, which is formed of a semi-rigid (or rigid) transparent (or semi-transparent) plastic and includes a speaker aperture 117 and alignment mechanisms comprised of a first alignment aperture 115a and a second alignment aperture 115b. One side of the alignment device 110 (either entirely or partially) includes an adhesive for attaching the alignment device 110 to the mobile telephone 10. As shown in FIG. 3, the alignment device 110 is attached to (stuck onto) the mobile telephone 10 so that the speaker of the mobile telephone 10 is encompassed fully within the speaker aperture 117 of the alignment device 110 to thereby allow sound emitted by the speaker to pass through the speaker aperture 117 unimpeded.

Figure 4:
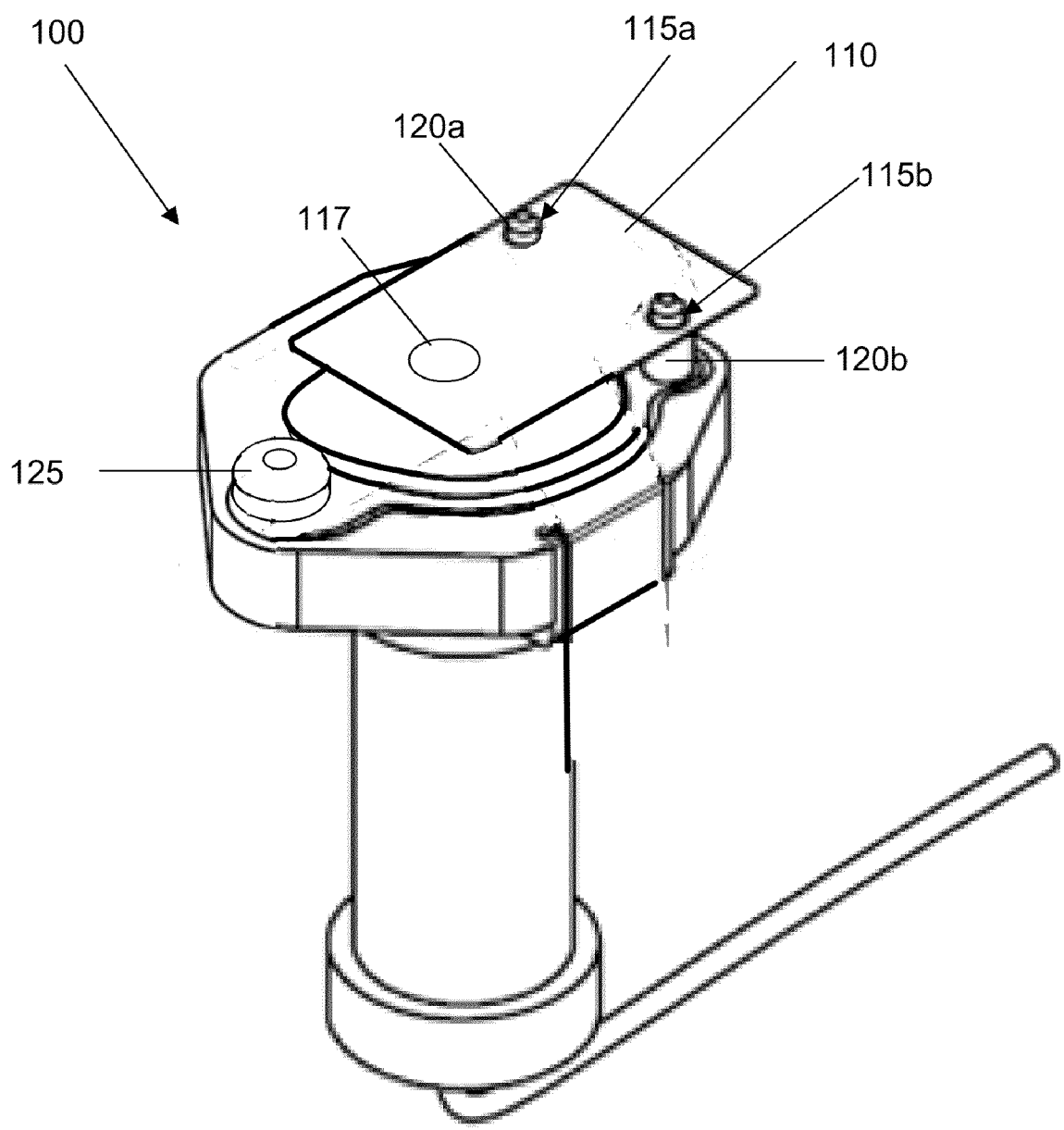
FIG. 4 depicts an ear simulator and alignment device in accordance with an example embodiment of the present invention.

FIG. 4 depicts of an example ear simulator assembly 100 with the alignment device 110 attached (although shown without a phone for explanatory purposes). The alignment mechanisms (e.g., alignment apertures 115) of the alignment device 110 engage the registration mechanisms (e.g., alignment posts 120) of the registration device of the ear simulator assembly 100. More specifically and as shown in FIG. 4, the first alignment aperture 115a is placed over a first alignment post 120a and the second alignment aperture 115b is placed over a second alignment post 120b.

The alignment device 110 is constructed so that when the first alignment aperture 115a is placed over the first alignment post 120a and the second alignment aperture 115b is placed over the second alignment post 120b, the speaker aperture 110 is disposed directly over the opening of the ear simulator of the ear simulator assembly 100. In addition, because the speaker aperture 117 encompasses the speaker of the mobile telephone 10 (as shown in FIG. 3), the speaker of the mobile telephone 10 also will be disposed directly over the opening of the ear simulator of the ear simulator assembly 100. Because the alignment device 110 is rigid (or semi-rigid), the alignment device 110 prevents lateral movement of the mobile telephone thereby ensuring that the speaker of the mobile telephone 10 will be maintained in alignment with the opening (e.g., the microphone) of the ear simulator of the ear simulator assembly 100. Once the alignment device 110 and the attached mobile telephone 10 are installed on the ear simulator assembly 100, a rubber stopper 125 supports the body of the mobile telephone 10 (in addition to being supported by the alignment device 110).

A key aspect of this example embodiment is that the spatial relationship between the speaker aperture 117 and the alignment mechanisms (e.g., the alignment apertures 115) is the same (identical) as the spatial relationship between the registration mechanisms (e.g., the registration posts 120) and the ear simulator (e.g., the opening of the ear simulator). The consistency of these two spatial relationships ensures that the speaker aperture 117 (and the telephone speaker) will align with the opening of the ear simulator 130 when the alignment device 110 (and attached telephone 10) is engaged with the registration device of the ear simulator assembly 100.

Figure 5:
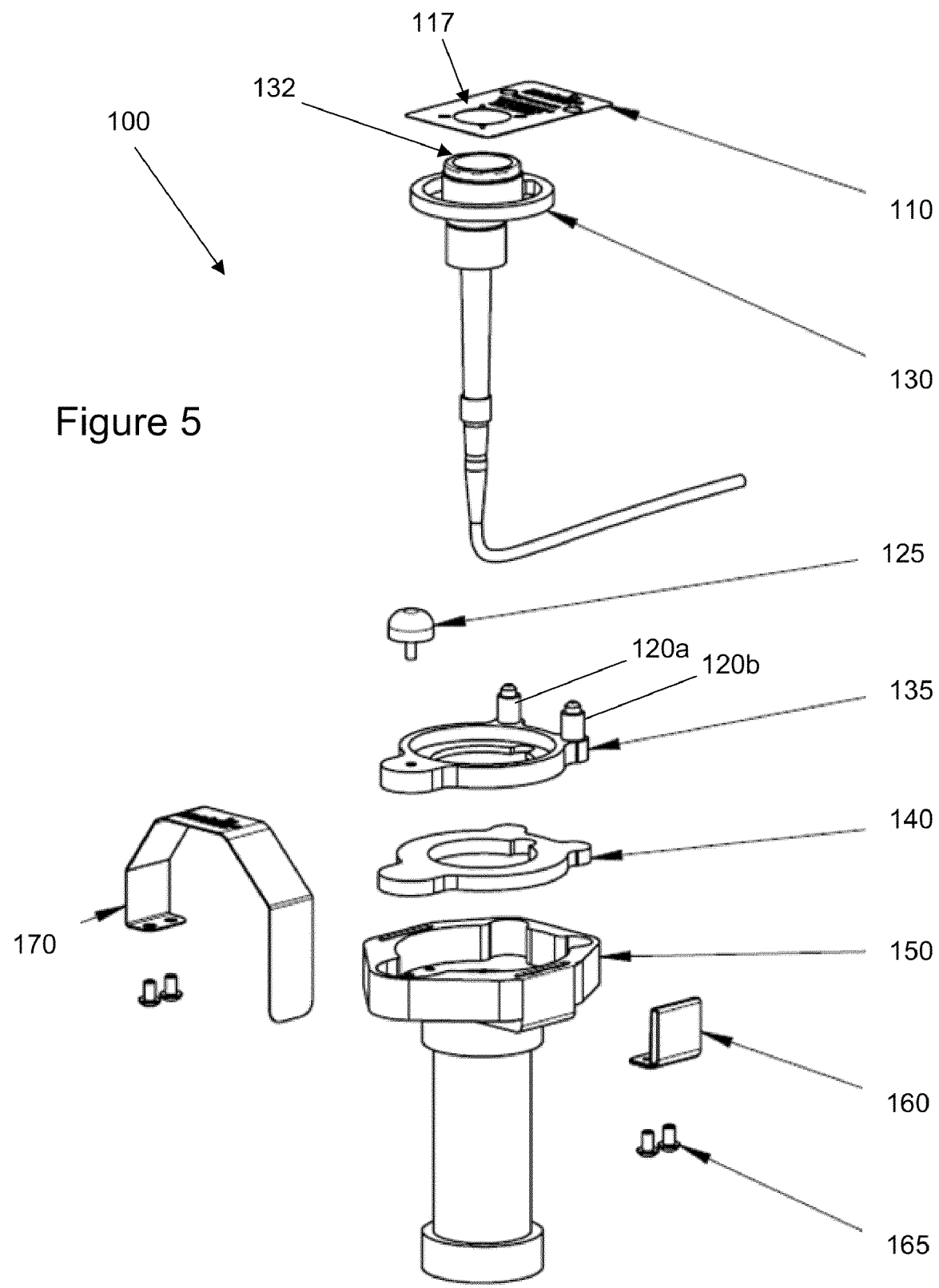
FIG. 5 provides an exploded view of an ear simulator and alignment device in accordance with an example embodiment of the present invention.

FIG. 5 provides an exploded view of the ear simulator assembly 100 according to an example embodiment of the present invention. As shown, the assembly 100 includes a body portion 150 adapted to receive a foam spring 140 onto which a cradle 135 is mounted. The rubber stopper 125 is mounted to the cradle 135. A fabric hook-and-loop stop 160, such as a VELCRO® stop, is attached to the body portion 150 with two screws 165. A fabric hook-and-loop strap 170, such as a VELCRO® strap, is attached to the opposite side of the body portion 150 with two screws. The ear simulator 130 is mounted to the cradle so that the electrical wiring (or an air pipe) extends through the body portion 150 to the test device.

The ear simulator 130 may include a microphone disposed in its top end to capture the audio outputs of the speaker of the mobile telephone 10 (received through the speaker aperture 117 of the alignment device 110). As illustrated in FIG. 5, the opening 132 of the ear simulator 130 is encompassed by the speaker aperture 117 when the alignment device 110 (and attached telephone 10) is secured to the ear simulator assembly 100 via use of the alignment and registration mechanisms.

Figure 6:
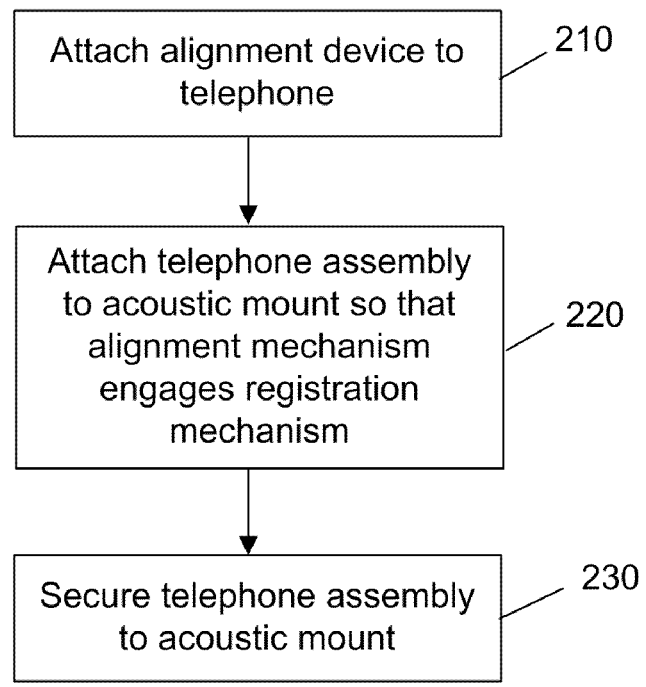
FIG. 6 is a flow chart of a method of using an acoustic mount in accordance with an example embodiment of the present invention.

FIG. 6 depicts a method of using an example embodiment of the present invention. At 210 the alignment device 110 is attached to the telephone 10 to be tested so that a speaker opening (e.g., speaker aperture 117) of the alignment device 110 encompasses the speaker of the telephone 10. In one example embodiment, the alignment device 110 includes a first side having an adhesive that adheres to the telephone 10. In other embodiments, other means of attaching the alignment device 110 to the telephone 10 may be employed such as, for example, mechanical clips (e.g., spring loaded), mechanical clamps, a band (e.g., a rubber band extending around the telephone 10 and alignment device 110), or other suitable mechanism. For purposes of this explanation, the alignment device 110 and attached telephone form a telephone alignment device assembly.

At 220 the telephone alignment device assembly is attached to the acoustic mount so that the alignment mechanisms of the alignment device 110 engage the registration mechanisms of the ear simulator assembly 100. In the example embodiment, the registration posts 120 are received by (extend through) the alignment apertures 115 of the alignment device 110.

Figure 7:
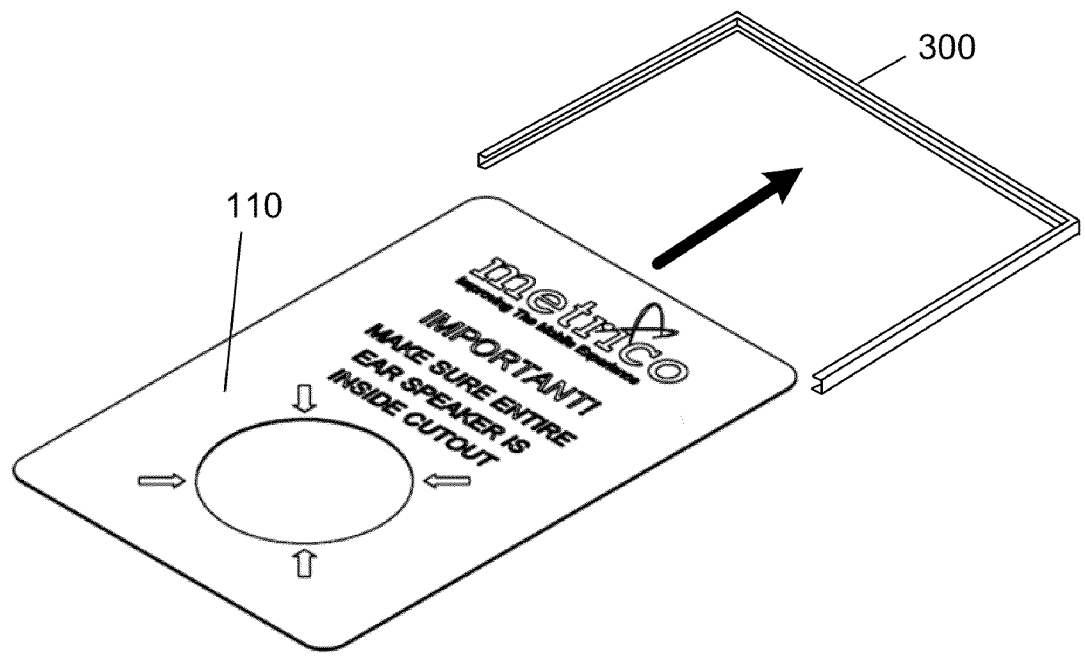
FIG. 7 depicts an alignment device and registration device in accordance with another example embodiment of the present invention.

In other embodiments, instead of using first and second registration posts, other means for ensuring that the telephone speaker and speaker aperture 117 (or other opening) will be in alignment with the ear simulator may be used. In the example embodiment above, the cradle 135 comprises the registration device and has two registration mechanisms (i.e., posts 120). Generally, the system may employ two or more alignment mechanisms on the alignment device 110 and two or more registration mechanisms forming part of a registration device of the ear simulator assembly 110. For example, the alignment device may slide into a registration device 300 as shown in FIG. 7. Thus, the edges of the alignment device 110 may form the plurality alignment mechanisms and the slot edges of the registration device 300 may form the plurality of registration mechanisms. Similarly, instead of using two circular posts and two circular apertures as illustrated above, the registration device may comprise a single square (or triangular) post and the alignment device may comprise a single square (or triangular) aperture, because the multiple sides of the square ensure the alignment of the aperture 117 with the ear simulator and prevent lateral movement of the alignment device 110. Thus, in such an embodiment the sides of the square (or triangle) may comprise the plurality of alignment and registration mechanisms. In yet another embodiment, the registration mechanisms may comprise one, two or more apertures (or indentations) configured to receive one, two or more posts (or protrusions) of the alignment device 110.

At 230 the telephone alignment device assembly is secured to the ear simulator assembly 100 of the acoustic mount such as through use of the fabric hook-and-loop fastener as shown in FIG. 1. Other methods of securing the telephone alignment device assembly may be used in other embodiments. In this embodiment, the mounting of the telephone alignment device assembly to the acoustic mount is performed without the need to make any adjustments to align the telephone speaker with the ear simulator.

Figure 8:
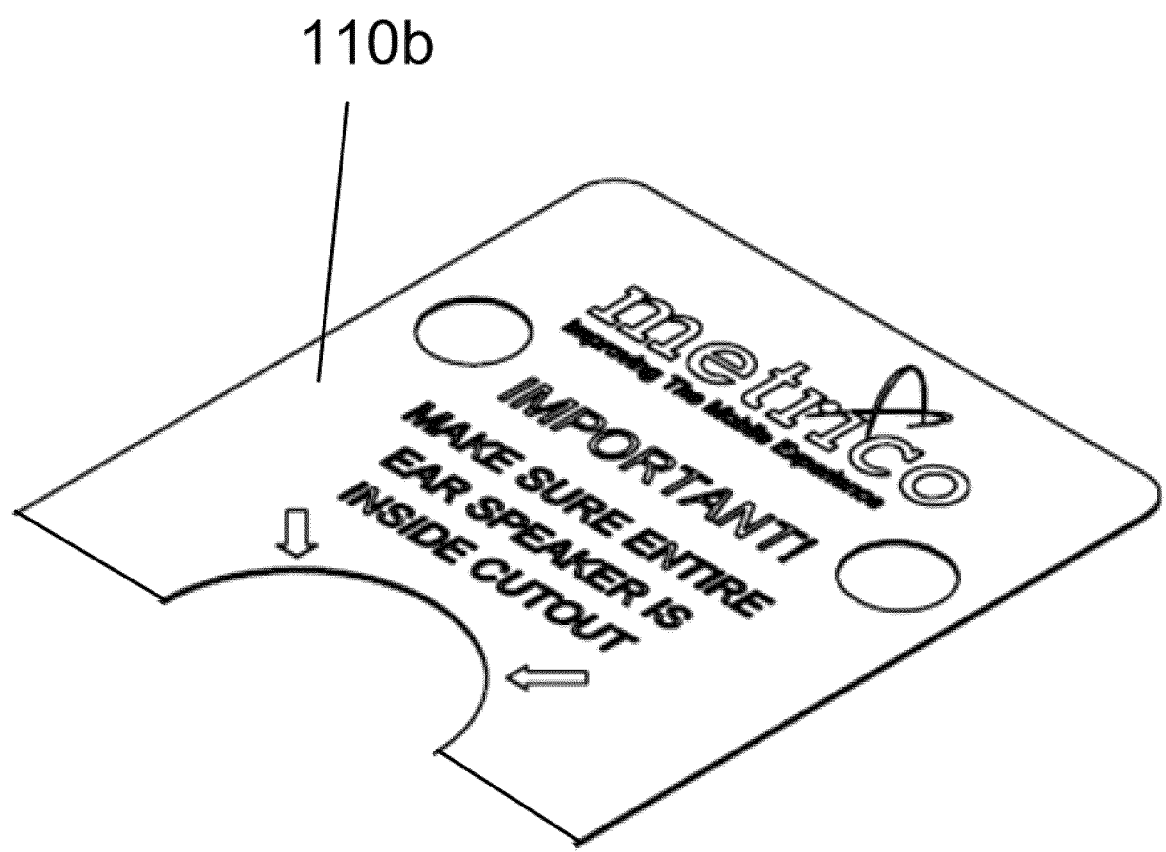
FIG. 8 depicts another example alignment device in accordance with an example embodiment of the present invention.

While the above described embodiments of the alignment device include a speaker aperture 117 any opening that allows the audio to be communicated to ear simulator 130 and that allows alignment of the speaker of the telephone 10 over the opening 132 of the ear simulator 130 may be employed. An example of another alignment device 110b having an opening that is not an aperture (an enclosed opening) is shown in FIG. 8.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. An acoustic mount system for testing telephones having a speaker, comprising:
   an ear simulator assembly having a first registration post, a second registration post, and an ear simulator;
   an alignment device having a first alignment aperture, a second alignment aperture, and a speaker opening;
   wherein said first alignment aperture and said second alignment aperture are spaced apart to receive said first registration post and said second registration post, respectively; and
   wherein when said first registration post is disposed through said first alignment aperture and said second registration post is disposed through said second alignment aperture, said speaker opening of said alignment device is in alignment with said ear simulator.

2. The system according to claim 1, further comprising a hook-and-loop strap attached to said ear simulator assembly and configured to secure the telephones to the ear simulator assembly.

3. The system according to claim 1, wherein said alignment device is formed of a transparent or semi-transparent material.

4. The system according to claim 1, wherein said alignment device comprises a first side having an adhesive.

5. A method of mounting a telephone having a speaker on an acoustic mount having a plurality of registration mechanisms, comprising:
   attaching an alignment device to the telephone so that a speaker opening of the alignment device is adjacent the speaker of the telephone;
   wherein the alignment device and the telephone form a telephone alignment device assembly;
   wherein the alignment device includes a plurality of alignment mechanisms; and
   mounting the telephone alignment device assembly to the acoustic mount so that the plurality of alignment mechanisms engage the plurality of registration mechanisms.

6. The method according to claim 5, wherein the plurality of alignment mechanisms comprises a plurality of apertures.

7. The method according to claim 5, wherein the plurality of alignment mechanisms comprises a plurality of edges.

8. The method according to claim 5, further comprising securing the telephone assembly to the acoustic mount with a hook-and-loop fastener.

9. The method according to claim 5, wherein the alignment device is formed of a transparent or semi-transparent material.

10. The method according to claim 9, wherein the alignment device comprises a first side having an adhesive; and
    wherein said attaching the alignment device to the telephone comprises attaching the alignment device to the telephone with the adhesive.

11. The method according to claim 5, wherein the plurality of alignment mechanisms comprises at least two sides of a square aperture.

12. The method according to claim 5, wherein the acoustic mount includes an ear simulator;
    wherein the plurality of registration mechanisms and the ear simulator have a first spatial relationship;
    wherein the plurality of alignment mechanisms and the speaker opening of the alignment device having a second spatial relationship; and
    wherein the first spatial relationship is identical to the second spatial relationship.

13. The method according to claim 5, wherein the plurality of alignment mechanism comprises a plurality of protrusions.

14. The method according to claim 5, wherein the alignment device comprises a first side having an adhesive; and
    wherein said attaching the alignment device to the telephone comprises attaching the alignment device to the telephone with the adhesive.

15. An acoustic mount system for testing a telephone having a speaker, comprising:
    an ear simulator assembly having a plurality of registration mechanisms and an ear simulator;
    wherein said plurality of registration mechanisms and said ear simulator have a first spatial relationship;
    an alignment device having a plurality of alignment mechanisms and a speaker opening;
    wherein said plurality of alignment mechanisms and said speaker opening have a second spatial relationship;
    wherein said alignment device is configured to be attached to the telephone;
    wherein each of said plurality of alignment mechanisms of said alignment device is configured to engage one of said plurality of registration mechanisms of said ear simulator assembly; and
    wherein said first spatial relationship is identical to said second spatial relationship.

16. The system according to claim 15, wherein the plurality of alignment mechanisms comprises a plurality of apertures.

17. The system according to claim 15, wherein the plurality of alignment mechanisms comprises a plurality of edges.

18. The system according to claim 15, further comprising a hook-and-loop strap attached to the ear simulator assembly for securing the telephone to the ear simulator.

19. The system according to claim 15, wherein said alignment device is formed of a transparent or semi-transparent material.

20. The system according to claim 15, wherein said alignment device comprises a first side having an adhesive; and
    wherein said alignment device is configured to be attached to the telephone via the adhesive.

21. The system according to claim 15, wherein the plurality of alignment mechanisms comprises at least two sides of a square aperture.

* * * * *